3,725,282
PASSIVE WAKE QUENCHING SYSTEM USING NONABLATING MATERIAL, SULFUR AND A SOLID NOBLE GAS FLUORIDE
Elliott K. Weinberg, 1329 Tiger Tail Drive, Riverside, Calif. 92506
No Drawing. Filed Apr. 15, 1971, Ser. No. 134,470
Int. Cl. B64g 1/00
U.S. Cl. 252—62          5 Claims

ABSTRACT OF THE DISCLOSURE

A system for protecting a spacecraft or vehicle from heat when the vehicle reenters the earth's atmosphere is provided that comprises an ablative composition or a porous nonablating material having dispersed therein (1) a mixture of a solid noble gas fluoride and elemental sulfur or (2) a solid noble gas fluoride.

FIELD OF THE INVENTION

This invention relates to the protection of reentry vehicles by wake quenching upon entering the earth's atmosphere. Wake quenching includes absorption of heat and electronic signature characteristic modification of plasma by a free electron binding mechanism.

BACKGROUND OF THE INVENTION

In the area of aerospace research, one of the problems encountered involves the protection of space vehicles from the intense heat generated upon reentry of a vehicle into the earth's atmosphere. Because of their inability to radiate and absorb large amounts of heat with relation to their weight, metallic heat shields have long since been replaced with systems employing ablative materials. Suitable ablative materials or ablators can be broadly designated as char-forming polymers. Heat shields are generally arcuate or conical in shape and are attached to a wall of the space vehicle to protect its interior from heat.

During exposure to relatively high temperature on the order of 600° F. and higher, char-forming polymers degrade to gaseous products and a carbonaceous surface residue. The carbonaceous char formed on the exposed surface of the polymer functions to reduce the rate of degradation by the combined effect of several phenomena. Thus, because of the surface layer of char, there is a steep temperature gradient between the exposed surface and the underlying unaffected polymer, thereby isolating the polymer from the high temperature environment. Furthermore, the transpiration of gases resulting from the char formation outwardly to the char surface reduces the inward conduction of heat, and the subsequent passage of the gases into the external flow results in cooling.

While light weight ablative systems are effective at relatively low reentry velocities such as those encountered in lunar and earth orbital flights, at the extremely high reentry speeds of interplanetary flights the systems would have to be very large to provide for adequate heat dissipation. This would result in greatly increasing the weight of the vehicle, a critical factor in space flight. It has been previously suggested to use transpirational cooling of the ablative heat shield. In one method this is accomplished by releasing a fluid through holes in the shield as the vehicle enters the earth's atmosphere. However, this method is not entirely satisfactory since it requires a complex arrangement of equipment, such as tanks, valves, plumbing, control equipment, and the like. All of this means added weight as well as additional equipment that could malfunction.

It is an object of this invention, therefore, to provide an improved system for protecting a spacecraft from heat upon reentry into the earth's atmosphere from an interplanetary flight.

Another object of the invention is to provide compositions which absorb heat accompanying reentry and also absorbs free electrons in the plasma generated by reentry heat to thereby modify the electronic signature or cross-section of the vehicle wake.

A further object of the invention is to provide a method for increasing a spacecraft's resistance to overheating upon reentry into the earth's atmosphere.

Other objects and advantages of the invention will become apparent to those skilled in the art upon consideration of the accompanying disclosure.

SUMMARY OF THE INVENTION

The present invention in one embodiment resides in a composition which comprises (1) a char-forming polymer, or a porous non-ablating materia land (2) a mixture of a solid noble gas fluoride and elemental sulfur, or a solid noble gas fluoride.

In another embodiment the invention resides in a method for protecting a spacecraft from the heat generated upon its reentry into the earth's atmosphere, the spacecraft being provided with a heat shield fabricated from the above described compositions. In accordance with this method, heat generated by friction between the earth's atmosphere and the heat shield causes the sulfur and fluoride to react or the fluoride, when used alone, to decompose, forming gases which are discharged into the areodynamic flow field of the craft. The gas or gases so formed and discharged function as a quenchant to protect the spacecraft from the extreme heat incident to the reentry. The formation of gases and their discharge as described can be referred to as "passive wake quenching."

Solid noble gas fluorides that can be used include fluorides of xenon, krypton and radon. These compounds are excellent fluorinators, forming sulfur hexafluoride, the gaseous quenchant, when reacted with sulfur. It is usually preferred to utilize one of the xenon fluorides which have relatively high melting points as shown in the following listing:

| Compound: | Melting point, ° C. |
|---|---|
| $XeF_2$ | 129 |
| $XeF_4$ | 117 |
| $XeF_6$ | 49.5 |

The following equation shows the reaction that occurs when a mixture of xenon difluoride and sulfur is employed:

$$3XeF_2 + S \rightarrow 3Xe + SF_6$$

The other solid noble gas fluorides and elemental sulfur react in a similar manner to form sulfur hexafluoride.

In the alternative method of passive wake quenching, a composition containing a solid noble gas fluoride as the sole quenchant-forming material is utilized in forming the heat shield. Noble gas bonds are relatively weak so that the compounds tend to behave chemicaly like atomic fluorine. Thus, when the heat shield is heated upon reentry of the spacecraft into the earth's atmosphere, the solid noble gas fluoride is decomposed, forming gaseous ions, such as $XeF^+$ and $KrF^+$ ions. The ions formed have very high electron affinity and provide excellent quenchants.

There are several methods used for fabricating heat shields from char-forming polymers or resins. For example, the ablative plastic composites can be prepared by premixing, molding and curing a formulation containing a liquid prepolymer resin, a curing agent, and a chopped or powdered reinforcing agent. In another method, fibers or cloth impregnated with a curable resin can be wrapped or wound on a form having a desired configuration. As will be evident to those skilled in the art, with many formulations a cure can be accomplished merely by heating in the absence of a curing agent. The shields can also be made by premixing and molding, at elevated temperatures and pressures, mixtures of powdered thermoplastics and fillers.

Examples of suitable char-forming polymers include phenolic resins, such as phenol formaldehyde and resorcinol formaldehyde resins; polyimide resins prepared by condensing an aromatic tetrabasic acid anhydride, such as pyromellitic dianhydride, with an aromatic diamine, such as the diphenyl diamines or diaminodiphenylethers; polybenzimidazole resins formed by the reaction of an aromatic tetramine, such as 3,3'-diaminobenzidine, and diphenyl isophthalate; phenyl silane resins; fusible polyphenylene resins; epoxy resins, epoxy novolak resins; fluorinated hydrocarbon polymers, such as polytetrafluoroethylene or a copolymer of hexafluoropropylene and tetrafluoroethylene; and the like. Examples of useful reinforcing agents include glass, fused silica, quartz, carbon and graphite filaments and asbestos, quartz, carbon and graphite fabrics. Examples of materials that can be employed as reinforcing agents and fillers in chopped or powdered form include silica, zirconia, glass, quartz, carbon, graphite, and the like.

In one method of preparing a member to be exposed to very high temperatures, such as a heat shield, the mixture of a solid noble gas fluoride and elemental sulfur or a solid noble gas fluoride, when used alone, is added with stirring to the liquid prepolymer resin. The quenchant forming materials when added are in finely divided form. After the quenchant-forming materials are thoroughly dispersed, a reinforcing agent in the form of a powder or cuttings is introduced. The stirring of the mixture is continued until all of the additives are completely dispersed. It is to be understood that the order of addition of the quenchant-forming materials and reinforcing agents can be reversed. The dispersion is then poured into a mold provided with a mold release agent and having a desired configuration. Thereafter, the mold is heated at an elevated temperature and for a time sufficient to cure the prepolymer.

When using a filament as the reinforcing agent, the dispersion of the quenchant-forming materials is initially prepared as described above. The filament is then slowly drawn through the dispersion, picking up the liquid resin containing the quenchant-forming materials. The amount of resin coated on the filament can be controlled by adjusting the length of the period during which the filament is in contact with the dispersion. The coated filament is then wound around a form to a desired thickness after which the resin is cured. When a fabric is used as the reinforcing agent, the procedure followed is very similar. The fabric is slowly immersed in a dispersion of the quenchant-forming materials and allowed to remain therein for a period of time necessary to thoroughly impregnate the fabric with the desired amount of resin. The impregnated fabric is then wrapped on a form to a desired thickness after which the resin is cured. The impregnated fabric can also be cut to a predetermined size and stacked in a matched metal die mold. The material in the mold is then subjected to an elevated temperature and pressure so as to obtain a molded composite. The heat shield or other members prepared in accordance with the above-described methods can be machined to provide, for example, smooth surfaces or desired shapes.

The amounts of the quenchant-forming materials and the reinforcing agent present in the composition of this invention can vary within rather wide limits. Generally, the amounts of quenchant-forming materials and the amount of the reinforcing agent are each in the range of about 15 to 75 weight percent with the remainder being the char-forming polymer or resin. When using filament or fabric wound composites, it is within the contemplation of the invention to provide thicknesses of the composite that contain varying amounts of the quenchant-forming materials and the reinforcing agent. Thus, an outer layer of a heat shield having, for example, a thickness of 1 inch, may contain 25 weight percent quenchant-forming materials, 50 weight percent reinforcing agent and 25 weight percent char-forming polymer. Subsequent layers of the composite may contain greater amounts of the quenchant-forming materials and less of the reinforcing agent. Such a composition ensures that a greater amount of quenchant will be available during the period when the temperatures are highest, i.e., at lower altitudes where the atmospheric density is greater.

As mentioned hereinbefore, a porous non-ablating material as well as a char-forming polymer can be used in preparing the composition of this invention. Examples of suitable porous materials are carbon and graphite foams having densities in the range of about 0.08 to 0.2 g./cc. and varying pore sizes. In the preparation of the composition, the carbon or graphite foam is impregnated with the quenchant-forming materials. This is accomplished by any suitable means such as by immersing the foam in a liquid melt of the mixture of solid noble gas fluoride and sulfur, or the solid noble gas fluoride. The melting point of the mixture will depend upon its composition and will be lower than the melting points of the pure ingredients, thus permitting some tailoring and control of the mixture melting temperatures. This is an important advantage not only in the manufacture of the composition but also in the control of heating in the transpiration process.

After immersion of the foam material in the melt, it is withdrawn and upon cooling the absorbed materials solidify in the pores of the foam. The amount of quenchant-forming materials absorbed will depend upon several factors, including the length of the period of immersion and the porosity of the particular foam employed. Generally, the amount of absorbed quenchant-forming material constitutes about 10 to 40 weight percent of the composition.

When a mixture of a solid noble gas fluoride and elemental sulfur is used, the mixture contains at least a stoichiometric amount of each individual ingredient. For example, when xenon difluoride is utilized, at least one mol of sulfur is mixed with 3 mols of the fluoride. The ingredients are thoroughly mixed prior to being added to the liquid prepolymer as described hereinabove.

Although the compositions of this invention can be employed to fabricate any structural part or member of a spacecraft that may be subjected to intense heat upon reentry into the earth's atmosphere, it is particularly useful in providing heat shields for interplanetary space vehicles. When a spacecraft enters the earth's atmosphere, its reentry speed is very high so that a great amount of heat is generated that increases as the density of the atmosphere increases. The amount of heat generated increases until the speed of the vehicle is slowed which also results, at least in part, from the increase in the density of the earth's atmosphere. Thus, the critical period insofar as protection of the spacecraft is concerned is during the early moments, e.g., the first 10 to 20 seconds, of reentry. Upon reentry the heat shield absorbs heat energy, thereby inducing chemical and/or thermophysical changes to occur in the quenchant-forming materials contained in the composition forming the shield. As a result, quenchant gases or vapors are released in the form of sulfur hexafluoride or gaseous noble gas fluoride ions depending upon whether the composition contains a mixture of a solid noble gas fluoride and sulfur or only a solid noble gas fluoride. Release of the quenchant gases into the atmospheric boundary layer or wake of the heat shield has the effect of blocking the incident heat flux to which its surface is exposed and reduces the heat carried by conduction through the shield. Furthermore, since the heat energy absorbed during reentry is proportional to the atmospheric density, being greater at higher densities, the quenchant is released at increasingly greater rates as the altitude decreases. Thus, greater amounts of the quenchant are automatically made available at the higher temperatures. As mentioned hereinbefore, it is also within the scope of the invention to provide compositions in which the concentration of quenchant-forming materials increase inwardly from the outer shield surface. This type of structure results in even greater amounts of the quenchant being made available during the period of reentry when the heat generated by friction between the heat shield and the earth's atmosphere is greatest.

A more complete understanding of the invention can be obtained by referring to the following illustrative example which is not intended, however, to be unduly limitative of the invention.

Example

A heat shield is fabricated from a liquid phenol formaldehyde resin, graphite cuttings and a mixture of xenon difluoride and elemental sulfur. The fluoride and sulfur are present in the mixture in a 3 to 1 mol ratio. The liquid resin is introduced into a vessel provided with a stirrer. The xenon difluoride and sulfur, both in particulate form and thoroughly mixed, are slowly added to the vessel while stirring. Thereafter, the graphite cuttings are slowly introduced into the vessel while continuing to stir. After the added materials are thoroughly dispersed in the liquid resin, the dispersion is poured into a stainless steel matched metal mold. The mold has an internal cavity corresponding to the shape of the heat shield. The dispersion contains 30 weight percent resin, 35 weight percent of the mixture of xenon difluoride and sulfur, and 35 weight percent graphite cuttings. The mold is heated electrically to 320° F. over a period of 6 hours, and then the temperature is reduced to room temperature over a period of 2 hours. After removing from the mold, the heat shield is post cured in an air circulating oven for 15 hours at 300° F. and atmospheric pressure. The shield is then machined to provide a smooth outer surface.

The heat shield is subjected to a high temperature, high velocity gas to simulate conditions that might be encountered by a spacecraft upon reentry into the earth's atmosphere. The heat shield ablates at a low rate and quenchant gases are released, thereby reducing the amount of heat carried by conduction through the heat shield.

As will be evident to those skilled in the art, various modifications of this invention can be made in the light of the foregoing disclosure without departing from the spirit or scope of the invention.

I claim:
1. A composition which consists essentially of (1) a char-forming polymer containing a reinforcing agent, or a porous nonablating material selected from the group consisting of carbon foam and graphite foarm, and (2) a quenchant-forming material selected from the group consisting of a mixture of a solid noble gas fluoride and elemental sulfur, and a solid noble gas fluoride, the amounts of reinforcing agent and quenchant-forming material dispersed in the char-forming polymer each being in the range of about 15 to 75 weight percent with the remainder being the char-forming polymer, and the amount of the quenchant-forming material absorbed in pores of the porous nonablating material being in the range of about 10 to 40 weight percent of the composition.

2. A composition according to claim 1 in which said noble gas fluoride is selected from the group consisting of xenon fluorides, krypton fluorides and radon fluorides.

3. A composition according to claim 1 in which said char-forming polymer is selected from the group consisting of a phenolic resin, a polyimide resin, a polybenzimidazole resin, fusible polyphenylene, a fluorinated hydrocarbon polymer, a phenyl silane resin, an epoxy resin and an epoxy novolak resin and said reinforcing agent is selected from the group consisting of glass, silica, quartz and graphite filaments; asbestos, quartz, carbon and graphite fabrics; and silica, zirconia, glass, quartz, carbon and graphite in chopped or powdered form.

4. A composition according to claim 3 in which said char-forming polymer is a phenol formaldehyde resin and said reinforcing agent is graphite in chopped form.

5. A heat shield fabricated from the composition of claim 1.

References Cited

UNITED STATES PATENTS

| | | | |
|---|---|---|---|
| 3,022,190 | 2/1962 | Feldman | 102—105 X |
| 3,026,806 | 3/1962 | Runton et al. | 102—105 |
| 3,395,035 | 7/1968 | Strauss | 102—105 |
| 3,454,372 | 7/1969 | Schwarzkopf | 102—105 X |
| 3,192,016 | 6/1965 | Malm et al. | 23—205 |
| 3,326,638 | 6/1967 | Cleaver | 23—205 |

GEORGE F. LESMES, Primary Examiner

R. E. MARTIN, Jr., Assistant Examiner

U.S. Cl. X.R.

102—105; 244—155; 117—46 CA, 46 CC, 137